United States Patent
Liao

(10) Patent No.: US 11,996,063 B2
(45) Date of Patent: May 28, 2024

(54) LCD PANEL, DRIVING METHOD AND DISPLAY DEVICE

(71) Applicant: Shenzhen China Star Optoelectronics Semiconductor Display Technology Co., Ltd., Shenzhen (CN)

(72) Inventor: Wenwu Liao, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/437,432

(22) PCT Filed: May 28, 2021

(86) PCT No.: PCT/CN2021/096761
§ 371 (c)(1),
(2) Date: Sep. 9, 2021

(87) PCT Pub. No.: WO2022/116488
PCT Pub. Date: Jun. 9, 2022

(65) Prior Publication Data
US 2023/0335076 A1    Oct. 19, 2023

(30) Foreign Application Priority Data
Dec. 4, 2020   (CN) .......................... 202011410691.4

(51) Int. Cl.
*G09G 3/36*   (2006.01)
*G02F 1/1362*   (2006.01)
*G02F 1/1368*   (2006.01)
*G09G 3/20*   (2006.01)

(52) U.S. Cl.
CPC ..... *G09G 3/3696* (2013.01); *G02F 1/136286* (2013.01); *G02F 1/1368* (2013.01); *G09G 3/2096* (2013.01); *G09G 2300/0852* (2013.01); *G09G 2320/0233* (2013.01); *G09G 2320/0247* (2013.01); *G09G 2340/0435* (2013.01)

(58) Field of Classification Search
CPC ............... G09G 3/3696; G09G 3/2096; G02F 1/136286
See application file for complete search history.

(56) References Cited

U.S. PATENT DOCUMENTS

| | | | |
|---|---|---|---|
| 9,916,799 B1 * | 3/2018 | Jo | G09G 3/2092 |
| 2014/0240268 A1 * | 8/2014 | den Boer | G09G 3/3648 345/173 |
| 2017/0249892 A1 * | 8/2017 | Jo | G09G 3/2092 |

FOREIGN PATENT DOCUMENTS

| | | | |
|---|---|---|---|
| CN | 101526702 A | 9/2009 | |
| CN | 104917990 | * 9/2015 | ............... H04N 7/01 |
| CN | 105551446 A | 5/2016 | |
| CN | 107039013 A | 8/2017 | |

(Continued)

*Primary Examiner* — Nelson M Rosario
*Assistant Examiner* — Scott D Au
(74) *Attorney, Agent, or Firm* — Menachem Nathan; Nathan & Associates

(57) ABSTRACT

An LCD panel, a driving method and a display device are provided. The LCD panel includes a fixed refresh rate mode or a dynamic refresh rate mode. In response to the variable refresh rate, the LCD panel provides a variable common voltage to the first electrode plate of the storage capacitor, thereby dynamically improving or eliminating the issues of the low voltage of the pixel electrode.

7 Claims, 3 Drawing Sheets

(56) References Cited

FOREIGN PATENT DOCUMENTS

| | | | | |
|---|---|---|---|---|
| CN | 109313881 | A | 2/2019 | |
| CN | 110660348 | A | 1/2020 | |
| CN | 110850650 | A | 2/2020 | |
| CN | 111508436 | * | 8/2020 | ........... G09G 3/3233 |
| CN | 111508436 | A | 8/2020 | |
| CN | 112462542 | A | 3/2021 | |
| KR | 20070094376 | A | 9/2007 | |

* cited by examiner

LCD PANEL, DRIVING METHOD AND DISPLAY DEVICE

CROSS REFERENCE TO RELATED APPLICATION

This application is a US national phase application based upon an International Application No. PCT/CN2021/096761, filed on May 28, 2021, which claims the priority of Chinese Patent Application No. 202011410691.4, entitled "LCD PANEL, DRIVING METHOD AND DISPLAY DEVICE", filed on Dec. 4, 2020, the disclosure of which is incorporated herein by reference in its entirety.

FIELD OF THE DISCLOSURE

The present disclosure relates to a display technology, and more particularly, to a liquid crystal display (LCD) panel, a driving method and a display device.

BACKGROUND

In recent years, the displays become more and more various because of the popularity of the e-sports. In the display, the Freesync (a dynamic refresh rate technique) becomes one of the key function indications of the e-sports display field.

Freesync was developed by AMD, which could solve the issues of picture breakup and interference and thus raise the picture fluency of the game. AMD called it a dynamic refresh rate (DDR) technique because it dynamically adjusts the refresh rate of the display to match the refresh rate of the graphic card. A display that supports FreeSync needs the coordination of an AMD graphic card and an accelerated processing unit (APU).

FreeSync adjusts the refresh rate of the display through changing the vertical blanking interval (Vblank). However, during the vertical blanking interval, the liquid crystal still has leakage currents, which makes the voltage level of the pixel electrode is lower. This makes the display have a larger luminance difference in different refresh rates or have flickers.

SUMMARY

Technical Problem

One objective of an embodiment of the present disclosure is to provide an LCD panel, a driving method and a display device, to alleviate the issues of flickers or larger luminance difference in different refresh rates.

Technical Solution

According to an embodiment of the present disclosure, an LCD panel is disclosed. The LCD panel provides a fixed common voltage to a first electrode plate of a storage capacitor in response to a fixed refresh rate in a fixed refresh rate mode and provides a variable first common voltage to the first electrode plate in response to a variable refresh rate in a variable refresh rate mode.

Optionally, when the variable refresh rate is smaller than the fixed refresh rate, the first common voltage is greater than the fixed common voltage.

Optionally, the LCD panel further comprises a timing controller and a power module connected to the timing controller. The timing controller is configured to receive an input signal and output a corresponding control instruction according to the input signal. The power module is configured to output the first common voltage according to the control instruction.

Optionally, the timing controller comprises a control unit and a rate identifying unit. The control unit has an output end connected to the power module. The rate identifying unit has an input end connected to the input signal and an output end connected to the power module.

Optionally, the input signal is an enabling signal.

Optionally, the enabling signal comprises a vertical blanking interval.

Optionally, the fixed refresh rate corresponds to a fixed vertical blanking interval and the variable refresh rate corresponds to a variable vertical blanking interval.

Optionally, when the variable refresh rate is smaller than the fixed refresh rate, the variable vertical blanking interval is greater than the fixed vertical blanking interval.

According to another embodiment of the present disclosure, a driving method of an LCD panel is disclosed. The driving method comprises: obtaining and identifying a fixed refresh rate mode or a dynamic refresh rate mode of the LCD panel, wherein the fixed refresh rate mode has a fixed refresh rate and the dynamic refresh rate mode has a dynamic refresh rate; utilizing the LCD panel to provide a fixed common voltage in response to the fixed refresh rate to a first electrode plate of a storage capacitor; and utilizing the LCD panel to provide a variable common voltage in response to the variable refresh rate to the first electrode plate of the storage capacitor.

According to still another embodiment of the present disclosure, a display device includes an LCD panel. The LCD panel provides a fixed common voltage to a first electrode plate of a storage capacitor in response to a fixed refresh rate in a fixed refresh rate mode and provides a variable first common voltage to the first electrode plate in response to a variable refresh rate in a variable refresh rate mode.

Advantageous Effect

According to an embodiment of the present disclosure, the LCD panel, the driving method and the display device provides a variable first common voltage to the first electrode plate of the storage capacitor in the dynamic refresh rate mode to dynamically improve or eliminate the issues of the low voltage of the pixel electrode. In this way, the issues of flickers or larger luminance difference in different refresh rates could be alleviated.

DETAILED DESCRIPTION

Specifically, the terminologies in the embodiments of the present disclosure are merely for describing the purpose of the certain embodiment, but not to limit the disclosure. Examples and the appended claims be implemented in the present disclosure requires the use of the singular form of the book "an", "the" and "the" are intended to include most forms unless the context clearly dictates otherwise. It should also be understood that the terminology used herein that "and/or" means and includes any or all possible combinations of one or more of the associated listed items.

In this embodiment, an LCD panel is disclosed. The LCD panel comprises an array substrate, a color filter substrate and a liquid crystal layer between the array substrate and the color filter substrate. Here, the array substrate has a first common electrode layer, a plurality of scan lines in the first direction and a plurality of data lines in the second direction. The first direction is not the same as the second direction. Specifically, the first direction could be vertical to the second direction. The color filter substrate has a second common electrode layer.

Figure 1:
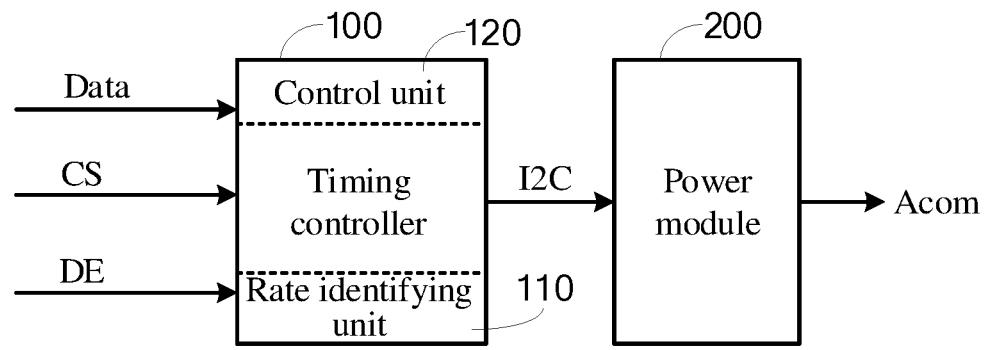
FIG. 1 is a diagram of an LCD panel according to an embodiment of the present disclosure.

Please refer to FIG. 1. FIG. 1 is a diagram of an LCD panel according to an embodiment of the present disclosure. The LCD panel comprises a timing controller 100 and a power module 200. The timing controller outputs corresponding control instructions to the power module 200 according to data signals Data, control signals CS and enabling signals DE inputted from the front-end video source. The power module 200 outputs a fixed common voltage Vcom or the first common voltage Acom according to the control instructions.

The timing controller 100 is connected to the power module through an inter-integrated circuit (I2C) bus. It could be understood that the I2C bus is simple and efficient and only requires two wires to transfer information between the devices connected to the bus. The server device is used to activate the bus to transfer data and generate a clock signal for the device to receive data. At this time, any addressed device could be regarded as a client device. On the bus, the server device and the client device and the relationship between receiving and transferring data are not fixed. It depends on the data transferring direction. If the mainframe needs to send data to the client device, then the mainframe firstly addresses the client device, actively sends data to the client device, and completes the data transfer. If the mainframe needs t receive the data from the client device, the server device addresses the client device and then the mainframe receives the data transferred from the client device and completes the data transferring process. In this situation, the mainframe is responsible for generating a clock signal and completing the data transfer.

The power module 200 is able to, but not limited to, comprise a power management chip.

Figure 2:
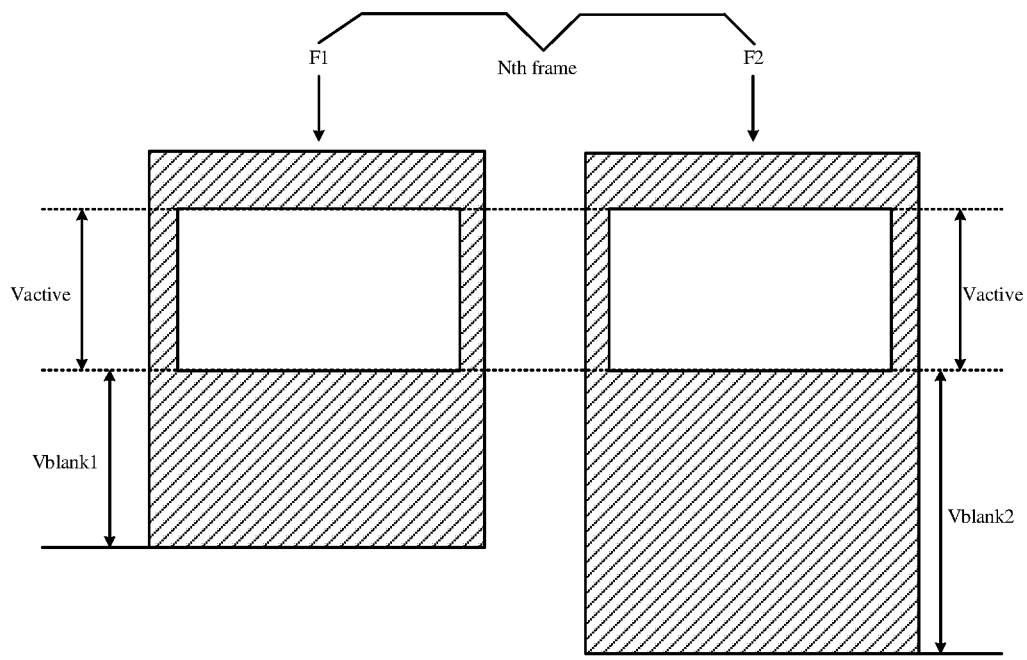
FIG. 2 is a diagram showing the frames shown in the LCD panel when the LCD panel is in different refresh rates according to an embodiment of the present disclosure.
Figure 3:
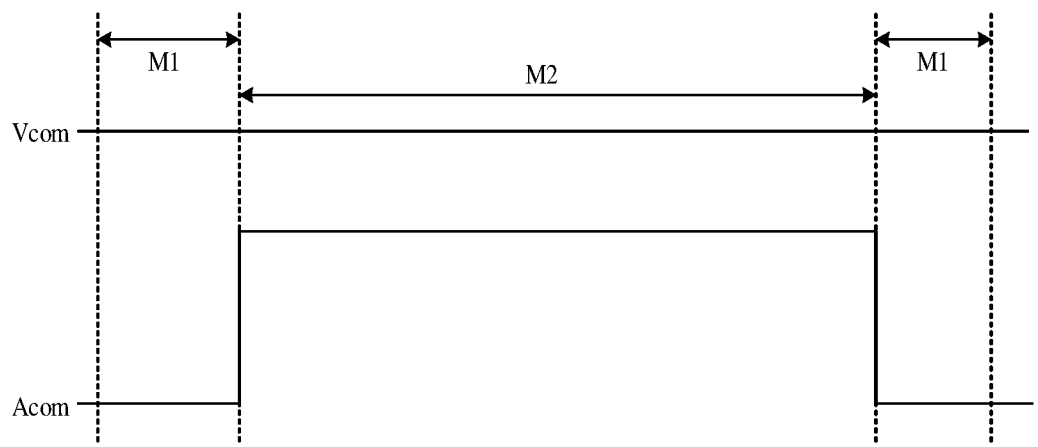
FIG. 3 is a diagram showing the common voltages when the LCD panel is in different refresh rate modes according to an embodiment of the present disclosure.

As shown in FIG. 2, the enabling signal DE comprises vertical blanking intervals. When the vertical blanking intervals are arranged as a fixed vertical blanking interval VBlank1, the refresh rate of the LCD panel is correspondingly arranged as a fixed refresh rate F1. When the vertical blanking intervals are arranged as a variable vertical blanking interval VBlank2, the refresh rate of the LCD panel is correspondingly arranged as a variable refresh rate F2. For the $n^{th}$ frame displayed by the LCD panel, even if the $n^{th}$ frame adopts a different fixed refresh rate F1 or the variable refresh rate F2, the vertical display interval Vactive of the $n^{th}$ frame is still the same. Here, N could be an integer.

Therefore, the LCD panel could have the fixed refresh rate mode M1 and the dynamic refresh rate mode M2, which could work alternatively. Here, the fixed refresh rate mode M1 has the fixed refresh rate F1, and the dynamic refresh rate mode M2 has the variable refresh rate F2. Please note, when the LCD panel works in the fixed refresh rate mode M1, the first common voltage Acom could be equal to the fixed common voltage Vcom. When the LCD panel works in the dynamic refresh rate mode M2 and the variable refresh rate F2 is lower than the fixed refresh rate F1, the first common voltage Acom is higher than the fixed common voltage Vcom.

Figure 4:
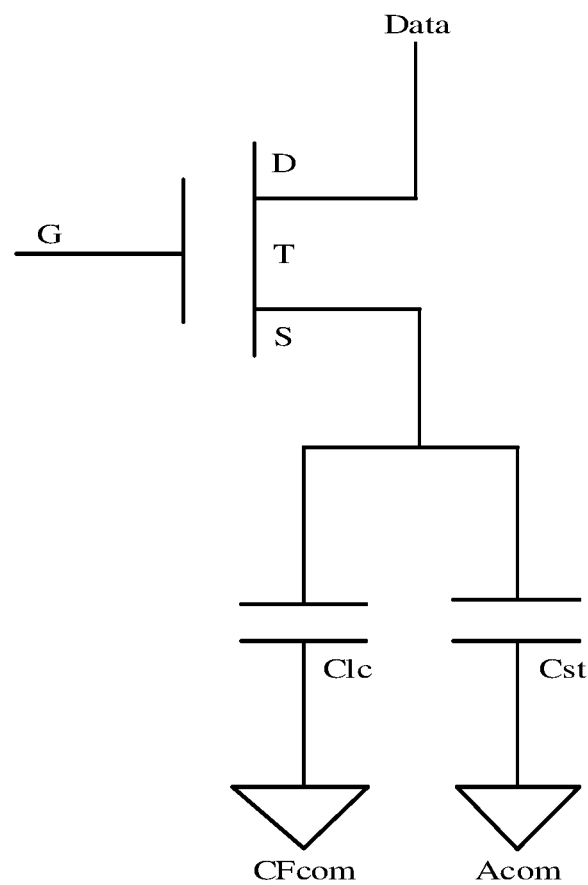
FIG. 4 is a diagram of a pixel driving circuit of the LCD panel according to an embodiment of the present disclosure.

As shown in FIG. 4, the above-mentioned LCD panel could comprise a plurality of pixel driving circuits arranged in an array. Each of the pixel driving circuits comprises a write-in transistor T, an LC capacitor CLc and a storage capacitor Cst. The data line is connected to one of the drain D/source S of the write-in transistor T. The gate G of the write-in transistor T is connected to the gate line. The other of the drain D/source S of the write-in transistor T is connected to the first electrode plate of the LC capacitor Clc and the second electrode plate of the storage capacitor Cst. The second electrode plate of the LC capacitor Clc is connected to the second common electrode layer of the color filter substrate. The first electrode plate of the storage capacitor Cst is connected to the first common electrode layer of the array substrate. Here, the data line is used to transfer data signals Data. Please note, the write-in transistor T1 could be, but not limited to, a P-type TFT. Or, the write-in transistor T1 could be an N-type TFT. It could be selected by the type of the scan signal transmitted in the scan lines.

The power module 200 outputs a second common voltage CFcom to the second common electrode layer and outputs a fixed common voltage Vcom or a first common voltage Acom to the first common electrode layer. Here, the second common voltage CFcom could be, but not limited to, outputted from the power module 200.

Because the LCD panel is working in the variable vertical blanking interval Vblank2 or the fixed vertical blanking interval Vblank1, the storage capacitor Cst has a leakage current through the first common electrode layer. Especially when the variable refresh rate F2 is lower than the fixed refresh rate F1 and the variable vertical blanking interval Vblank2 is greater than the fixed vertical blanking interval Vblank1, the leakage current problem becomes more severe. In this way, the LCD panel has lower luminance in the variable refresh rate F2 in contrast to the luminance in the fixed refresh rate F1 and thus the luminance difference ΔLum is more apparent. This seriously affects the display quality and cannot comply with the Freesync verification from AMD.

The refresh rate of most of the displays is fixed as 60 Hz. The refresh rate of the displays having a higher refresh rate could reach 75 Hz, 120 Hz or 144 Hz. The display supporting Freesync is refreshed along with the game and the limit is the highest refresh rate. The refresh rate will be adjusted to be a lower one only when it's necessary. Compare with some simple 3D PC games, the player does not need to use the Freesync function. When the player is playing these games, the refresh rate of the common graphic card could be easily greater than 60 frames/second and thus software program could use V-Sync technique to synchronize the refresh rate of the display with the frame rate of the games.

However, for some latest games that requires a higher graphic processing capability, even if the very modern desktop computer is used, the game could be run under 40 or 50 frames/second, which is lower than the 60 frames/second of the display. This means that the display panel receives a new frame during it refreshes a frame image and thus the display panel only displays a part of each of the two frames. This introduces the image breakup. By using the Freesync technique, the refresh rate of the display could be adjusted to be higher or lower to be consistent with the frame rate of the game such that the image breakup issue could be avoided.

Based on that, the LCD panel provides a variable first common voltage Vcom to the first electrode plate of the storage capacitor Cst in response to the variable refresh rate F2. In contrast to the conventional art, which provides the common voltage COM to the first electrode plate of the storage capacitor Cst, the first common voltage Acom could be adjusted to be increased to dynamically improve or eliminate the issues of low voltage of the pixel electrode. This improves or eliminates the issues of the luminance difference ΔLum in different refresh rates or flickers.

Figure 5:
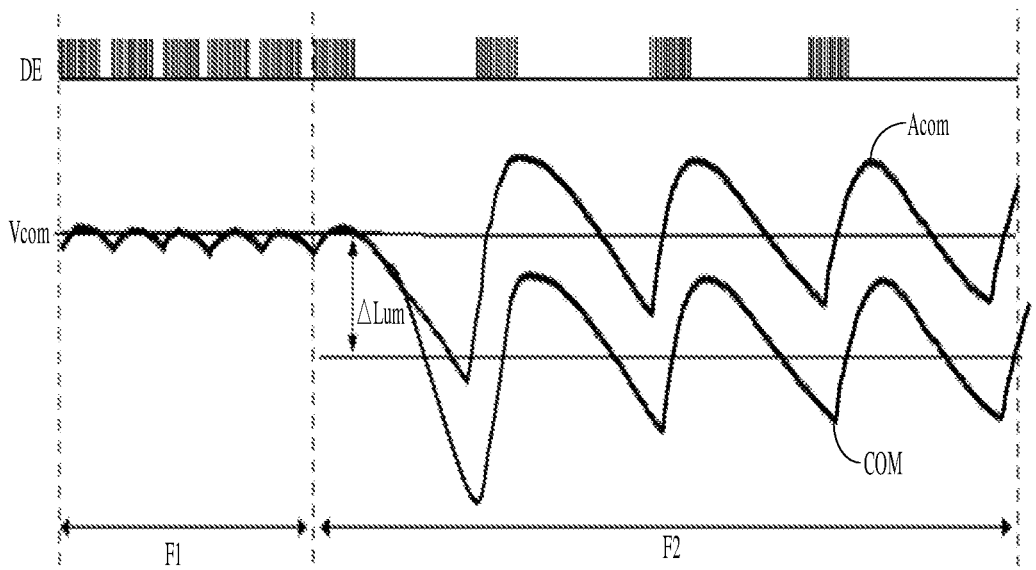
FIG. 5 is a diagram showing the common voltages when the LCD panel is in different refresh rate according to an embodiment of the present disclosure.

As shown in FIG. 5, in one embodiment, the LCD panel provides a fixed common voltage Vcom to the first electrode plate in response to the fixed refresh rate F1. When the variable refresh rate F2 is lower than the fixed refresh rate F1, the first common voltage Acom is greater than the common voltage Vcom.

The timing controller 100 further comprises a control unit 120 and a rate identifying unit 110. The input end of the rate identifying unit 110 is connected to the enabling signal DE. The control unit 120 is connected to the output end of the rate identifying unit 110 and the power module 200.

The rate identifying unit 110 could obtain the current refresh rate of the LCD panel according to the enabling signal DE. When the refresh rate is equal to the fixed refresh rate F1, the LCD panel is in the fixed refresh rate mode M1. When the refresh rate is not equal to the fixed refresh rate F1, the LCD panel is in the dynamic refresh rate mode M2. When the refresh rate is lower than the fixed refresh rate F1, the timing controller 100 increases the first common voltage Acom outputted by the power module 200 according to the corresponding control instructions. When the refresh rate is lower, the first common voltage Acom is greater.

Figure 6:
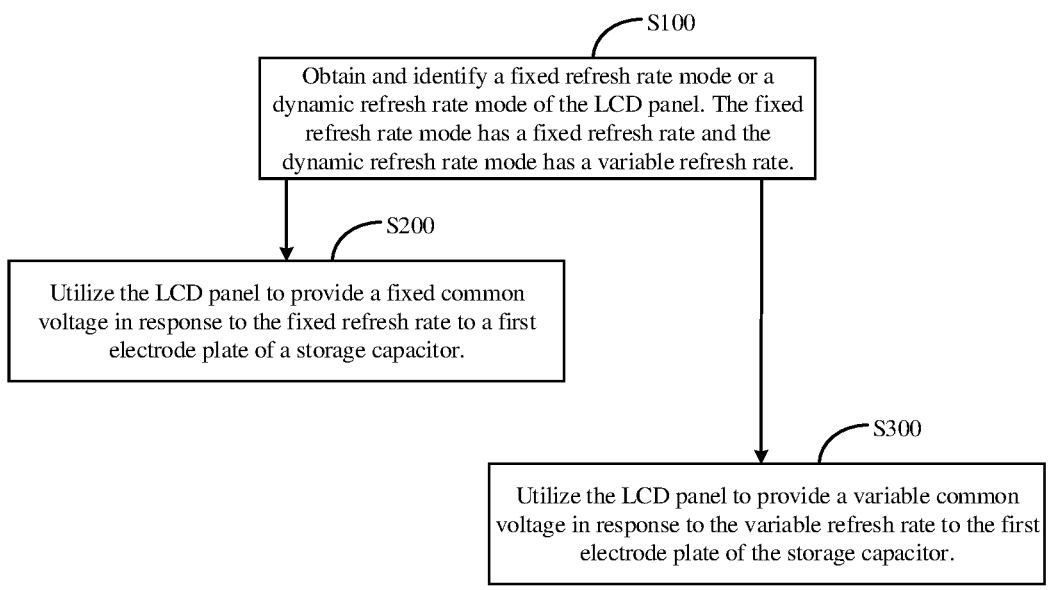
FIG. 6 is a flow chart of a driving method of the LCD panel according to an embodiment of the present disclosure.

As shown in FIG. 6, a driving method of an LCD panel is disclosed. The driving method comprises following steps:

Step S100: Obtain and identify a fixed refresh rate mode M1 or a dynamic refresh rate mode M2 of the LCD panel. The fixed refresh rate mode M1 has a fixed refresh rate F1 and the dynamic refresh rate mode M2 has a variable refresh rate F2.

Step S200: Utilize the LCD panel to provide a fixed common voltage Vcom in response to the fixed refresh rate F1 to a first electrode plate of a storage capacitor Cst.

Step S300: Utilize the LCD panel to provide a variable common voltage Acom in response to the variable refresh rate F2 to the first electrode plate of the storage capacitor Cst.

In this embodiment, through providing the variable first common voltage Acom to the first electrode plate of the storage capacitor Cst in the dynamic refresh rate mode M2, the driving method could dynamically improve or eliminate the issues of the luminance difference ΔLum in different refresh rates or flickers.

Furthermore, a display device is disclosed according to an embodiment of the present disclosure. The display device comprises an LCD panel of any one of the above-mentioned embodiments.

In this embodiment, through providing the variable first common voltage Acom to the first electrode plate of the storage capacitor Cst in the dynamic refresh rate mode M2, the display device could dynamically improve or eliminate the issues of the luminance difference ΔLum in different refresh rates or flickers.

The display device could be, but not limited to be, an LCD panel. The LCD panel could comprise a polarization film, a glass substrate, a black matrix, a color filter, a protective film, a common electrode, an adjustment layer, an LC layer, a capacitor, a display electrode, a prism layer, and a light dissipation layer.

The polarization film is called polarizer. The polarizer has a top polarizer and a bottom polarizer. The top polarizer and the bottom polarizer are vertical to each other. The polarizer is like a fence, which could block a portion of a light wave. For example, the portion of the light wave that is vertical to the polarizer is blocked and the portion of the light wave that is parallel to the polarizer could pass through the polarizer.

The glass substrate of the LCD panel has a top substrate and a bottom substrate. The two substrates sandwich the LC materials. The material of the glass substrate often adopts a non-alkali borosilicate glass having a good mechanical structure, a good heat endurance, and a chemical resistance. For a TFT-LCD, one glass substrate comprises TFTs and the other glass substrate has a color filter deposited on it.

The black matrix is manufactured with a material having a high light blocking characteristic and is used to isolate the red, blue, and green light (to avoid color confusion) to raise the contrast of each color block. In addition, in the TFT-LCD, the black matrix could cover the inner wires or TFTs.

The color filter is used to generate red, blue, and green light to achieve the color display of the LCD panel.

The alignment layer is used to achieve an even arrangement and alignment of the LC molecules in a microscopic view.

The transparent electrode could be divided into a common electrode and a pixel electrode. The input signal voltage is applied between the pixel electrode and the common electrode. The transparent electrode is often manufactured by depositing an ITO material on the glass substrate.

The LC material is used as a light valve to control the luminance of the light that passes the LC material to get the picture display effect.

The driver integrated circuit chip (IC) is an integrated circuit device used to adjust and control the phase, amplitude and frequency of the voltage signal of the transparent electrode to establish the driving voltage such that the information could be displayed on the LCD.

In the LCD panel, the active matrix LCD panel is manufactured by sealing the twisted nematic (TN) type LC material into the space between the two glass substrates. Here, the red, green, and blue (RGB) color filters (color filtering films), the black matrix, and the common transparent electrode are deposited on the top glass substrate, which is closer to the display panel. The TFTs, the transparent pixel electrodes, the storage capacitors, the gate lines and data lines are placed on the bottom glass substrate, which is comparatively far away the display panel. The alignment films (alignment layers) are placed on the inner sides of the two glass substrates to make the LC molecules arrange in a certain direction. The LC material is filled in the space between the two glass substrates and the spacer is placed in the space between the two glass substrates as well to ensure the uniformity of the gaps. The frame glue is placed on the sides to seal the panel. The conductive adhesive is used to connect the common electrodes of the two glass substrates.

The polarizers (polarizing films) are respectively pasted on outer sides of the two glass substrates. When a voltage is applied between the pixel transparent electrode and the common transparent electrode, the arrangement of the LC molecules changes. At this time, the amplitude of the light passing through the LC also changes. The LCD utilizes this optical activity of the LC material and applies the corresponding electric field to display information.

The LCD is a non-active light emitting electronic device, which means that it cannot generate light by itself. Instead, the LCD needs the light source in the backlight module to display information. Therefore, the luminance of the LCD is determined by the backlight module. Accordingly, the performance of the backlight module directly affects the display quality of the LCD panel.

The backlight module comprises a light source, a reflector sheet, a light guiding plate, a diffuser, a brightness enhancement film, and a frame. The backlight module could be divided into two categories, back-lit and edge-lit backlight modules. The cell phone, the laptop and the monitor (15 inch) only use edge-lit backlight module. The LCD TV often uses the back-lit backlight module. The light source often uses cold cathode fluorescent lamp (CCFL) or light emitting diodes (LED).

The reflector sheet is used to send the light generated by the light source to the light guiding plate without any loss.

The light guiding plate is used to guide the light generated by the side light source to the front of the panel.

The prism film is also called brightness enhancement film. The prism film is used to enhance the brightness by refracting and fully reflecting the diffused light to send the concentrated light to the backlight module in a certain angle.

The diffuser is to diffuse the light from the edge-lit light source into a surface light source. The diffuser could have an upper diffuser and a lower diffuser. The upper diffuser is placed between the prism film and the LC components and is closer to the display panel. The lower diffuser is placed between the light guiding plate and the prism film and is closer to the backlight module.

The LCD is a display using LC as its material. The LC is an organic compound between a solid state and a liquid state. In a room temperature, the LC has a liquidity of a liquid and an optical anisotropy of a crystal. The LC become a liquid when it's heated up and becomes a crystalline turbid solid when It's cooled down.

When the electric field is applied on the LC molecules, the arrangement of the LC molecules changes to affect the amplitude of the light passing through the LC molecules. This change becomes more apparent through the effect of the polarizer. Accordingly, the luminance could be controlled by controlling the electric field such that the information could be displayed. Therefore, the LC material is used as a "light valve."

Because there is a control circuit and a driving circuit in the peripheral region of the LC material, when the electric field is generated by the electrodes of the LCD, the LC molecules rotate accordingly such that the light passing through the LC molecules is refracted (according to the optical anisotropy of the LC material) and filtered by the second polarizer to be displayed on the LCD panel.

Please note, the LC material does not generate light. Therefore, the LCD needs a light source for the display panel. This light source system is called "backlight module." Ordinarily, the backlight plate comprises fluorescence materials, which could generate light to provide a uniform backlight source.

The LCD technique is to inject the LC material into two surfaces having trenches. The trenches of the two surfaces are vertical to each other. That is, if the LC molecules on one surface are arranged along the x axis, the LC molecules on the other surface are arranged along the y axis. That is, the LC molecules on the two surfaces are forced to be twisted by 90 degrees. Because the light is transferred along the arrangement direction of the LC molecules, the light is rotated by 90 degrees as well. When a voltage is applied on the LC molecules, the LC molecules are rotated to change the transparency and thus multiple grey scales could be displayed.

The LCD often comprises two polarizers, which are vertical to each other. The polarizer works like a fence, which could block a portion of a light wave. For example, the portion of the light wave that is vertical to the polarizer is blocked and the portion of the light wave that is parallel to the polarizer could pass through the polarizer. The natural light is transferred in all directions. Therefore, the two polarizers should block all natural light in a normal situation. However, because the twisted LCs are filled up with the space between the two polarizers, the light may pass through the first polarizer and then be rotated by 90 degrees so that the rotated light could then pass through the second polarizer.

As to the LCD in a laptop or a desktop computer, a more complex color display is adopted.

For the color LCD, a color filtering layer (i.e. color filter) should be implemented. In the color LCD, each pixel comprises three sub-pixels. The red, green or blue color filter is placed in front of each of the three sub-pixels. In this way, the light passing through the color filter could show different colors.

The color filter, the black matrix and the common transparent electrode are often deposited on the front glass substrate of the display panel. The color LCD could display a colorful picture in a high definition.

For the motion pictures, human eyes have the effect of "persistence of vision", which means that a high-speed object will leave an optical illusion. The movies, cartoons, or games often use this effect to make a series of pictures look like a dynamic video.

When the frame rate of playing a series of pictures is higher than 24 frames per second, a human will regard these pictures as a continuous video. This is the reason why the movie has a 24 frame/second frame rate. If the frame rate is lower than 24 frames per second, a human could feel that the movie has pauses. According to the 24 frame/second frame rate, we could understand that each picture needs to be played within 40 ms. In a high definition condition, the frame rate needs to be higher than 60 frames per second, which means that a picture needs to be played within 16.67 ms.

If the response time of the LC is longer than the interval between the frames, the viewer may feel the high-speed object is not clear. The response time is a specific indicator of the LCD. The response time of the LCD represents a response speed for each pixel of the display in response to an input signal. That is, the response time refers to a pixel from dark to bright or from bright to dark. The response time should be as short as possible, which means that the response is fast enough to ensure the continuity of the motion pictures. If the response time is too long, the after-image effect may occur when the LCD displaying motion pictures. Preferably, the response time of the an LCD is 2-5 ms.

The TFTs represent the transistor array on the glass substrate of the LCD panel such that each pixel has its corresponding semiconductor switch. Each pixel could control the LCs between the two glass substrates through the point impulse. That is, each of the pixels could be independently and accurately controlled in a "point-to-point" method through the active switch. Therefore, each pixel is independent and could be continuously controlled.

The TFT-LCD comprises a glass substrate, a gate, a drain, a source and an a-Si layer.

The TFT array, the transparent pixel electrode, the storage capacitor, the gate lines, and the data lines are deposited on the back glass substrate (the substrate far away from the display panel) of the display panel. This arrangement of the transistor array could raise the response speed of the LCD and could control the display grayscale. In this way, the LCD panel could have a better display color and display quality. Therefore, most of the LCDs, LCD TVs and cell phones are driven by TFTs. The TN-type middle to small size LCD and the IPS-type large size LCD TV having a wider view angle are called TFT-LCD.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. A liquid crystal display (LCD) panel, comprising:
a timing controller, configured to receive an enabling signal and output a control instruction according to the enabling signal that comprises a vertical blanking interval;
a power module, connected to the timing controller, configured to output the first common voltage according to the control instruction;
wherein the LCD panel provides a fixed common voltage to a first electrode plate of a storage capacitor in response to a fixed refresh rate in a fixed refresh rate mode and provides a variable first common voltage to the first electrode plate in response to a variable refresh rate in a dynamic refresh rate mode,
wherein the fixed refresh rate corresponds to a fixed vertical blanking interval and the variable refresh rate corresponds to a variable vertical blanking interval,
wherein when the variable refresh rate is smaller than the fixed refresh rate, the first common voltage is greater than the fixed common voltage and the variable vertical blanking interval is greater than the fixed vertical blanking interval.

2. The LCD panel of claim 1, further comprising:
a plurality of pixel driving circuits arranged in an array, wherein each of the pixel driving circuits comprises the storage capacitor.

3. The LCD panel of claim 2, wherein each of the pixel driving circuits comprises:
a data line;
a scan line; and
a write-in transistor, wherein a source or a drain of the write-in transistor is connected to the data line and a gate of the write-in transistor is connected to the scan line.

4. The LCD panel of claim 3, wherein of the pixel driving circuits further comprises:
a liquid crystal (LC) capacitor, wherein another of the source and the drain of the write-in transistor is connected to a first electrode of the LC capacitor and a second electrode of the storage capacitor.

5. The LCD panel of claim 4, further comprising:
an array substrate, comprising a first common electrode layer, connected to the first electrode plate of the storage capacitor.

6. The LCD panel of claim 5, further comprising:
a color filter substrate, comprising a second common electrode layer, connected to a second electrode plate of the LC capacitor.

7. A display device, comprising a liquid crystal display panel, the LCD panel comprising:
a timing controller, configured to receive an enabling signal and output a control instruction according to the enabling signal that comprises a vertical blanking interval;
a power module, connected to the timing controller, configured to output the first common voltage according to the control instruction;
wherein the LCD panel provides a fixed common voltage to a first electrode plate of a storage capacitor in response to a fixed refresh rate in a fixed refresh rate mode and provides a variable first common voltage to the first electrode plate in response to a variable refresh rate in a dynamic refresh rate mode,
wherein the fixed refresh rate corresponds to a fixed vertical blanking interval and the variable refresh rate corresponds to a variable vertical blanking interval,
wherein when the variable refresh rate is smaller than the fixed refresh rate, the first common voltage is greater than the fixed common voltage and the variable vertical blanking interval is greater than the fixed vertical blanking interval.

* * * * *